United States Patent [19]

Akao

[11] Patent Number: 4,921,737
[45] Date of Patent: May 1, 1990

[54] CONTAINER FOR PHOTOGRAPHIC FILM CARTRIDGE

[75] Inventor: Mutsuo Akao, Kanagawa, Japan

[73] Assignee: Fuji Photo Film Co., Ltd., Kanagawa, Japan

[21] Appl. No.: 213,600

[22] Filed: Jun. 30, 1988

[30] Foreign Application Priority Data

Jul. 2, 1987 [JP] Japan .................. 62-164077

[51] Int. Cl.⁵ .................................. B27N 5/02
[52] U.S. Cl. ..................... 428/36.92; 206/316.1; 206/407; 524/229; 524/583
[58] Field of Search ............... 523/200; 524/108, 232, 524/231, 229, 583; 428/36.92; 206/316.1, 407

[56] References Cited

U.S. PATENT DOCUMENTS

| | | | |
|---|---|---|---|
| 4,307,009 | 12/1981 | Lüders et al. | 524/166 |
| 4,338,228 | 7/1982 | Inoue et al. | 525/78 |
| 4,639,386 | 1/1987 | Akao | 206/407 |
| 4,753,760 | 7/1988 | Kawaguchi et al. | 264/130 |

OTHER PUBLICATIONS

Patent Abstracts of Japan, vol. 10, No. 243, Aug. 21, 1986, JP-A-6173947.
Patent Abstracts of Japan, vol. 11, No. 375, Dec. 8, 1987, JP-A-62145242.
Chemical Abstracts, 83: 115816b (1975).
Chemical Abstracts, 107: 237993s (1987).
Chemical Abstracts, 103: 86654w (1985).

Primary Examiner—James J. Seidleck
Attorney, Agent, or Firm—Burns, Doane, Swecker & Mathis

[57] ABSTRACT

A container body for photographic film cartridge composed of a resin comprising more than 70 wt. % of polypropylene resin, 0.01 to 2 wt. % of a fatty acid amide lubricant, 0 to 1 wt. % of an antioxidant and 0.01 to 1 wt. % of an organic nucleating agent of which the surface has previously been treated with a stabilizer selected from the group consisting of aliphatic metal salts, metal salts of alkyl lactic acids and metal salts of lactic acid.

The container body of the invention is excellent in dropping strength, transparency and odor. The injection moldability is also excellent, because of good resin fluidity and high crystallization temperature.

11 Claims, 2 Drawing Sheets

CONTAINER FOR PHOTOGRAPHIC FILM CARTRIDGE

BACKGROUND OF THE INVENTION

1. Field of the Invention

This invention relates to a container for a photographic film cartridge.

2. Description of the Prior Art

The body of a conventional container for a photographic film cartridge was made of high density polyethylene resin, homopolypropylene resin not containing ethylene unit or block-type or random-type polypropylene resin containing about 2 wt.% of ethylene unit of which melt flow rate (MFR) was about 10 g/10 minutes in order to secure rigidity and to prevent burrs and stringiness at the injection molding. Since these resins were inferior in transparency, they were colored by blending a pigment. The resins were also inferior in fluidity, and short shot and weld line were liable to occur. The physical strength was insufficient, and the thickness was necessary to be thickened. As a result, transparency became worse, cooling time was elongated, the resin amount increased, and the container body was expensive.

On the other hand, the present inventor has completed another container body for a photographic film cartridge improved in transparency, injection moldability and the like (U.S. Pat. No. 4,639,386, Japanese Patent KOKAI No. 73947/1986). However, this container evolved bad smell at the injection molding caused by inorganic or organic nucleating agent added thereto.

SUMMARY OF THE INVENTION

An object of the invention is to provide a container body for photographic film cartridge which does not evolve bad smell at the injection molding.

Another object of the invention is to provide a container body for photographic film cartridge which is excellent in physical strength and transparency.

Another object of the invention is to provide a container body for photograhic film cartridge which is excellent in moldability.

The present invention provides a container body which has achieved the above objects, and it is composed a polypropylene resin containing a lubricant, an antioxidant and the organic nucleating agent of which the surface had been treated with a stabilizer, in the prescribed amount respectively.

Thus, the container body of the invention is composed of a resin comprising more than 70 wt. % of polypropylene resin, 0.01 to 2 wt. % of a fatty acid amide lubricant, 0 to 1 wt. % of an antioxidant and 0.01 to 1 wt. % of an organic nucleating agent of which the surface has previously been treated with a stabilizer selected from the group consisting of aliphatic metal salts, metal salts of alkyl lactic acids and metal salts of lactic acid.

DETAILED DESCRIPTION OF THE INVENTION

Figure 1:
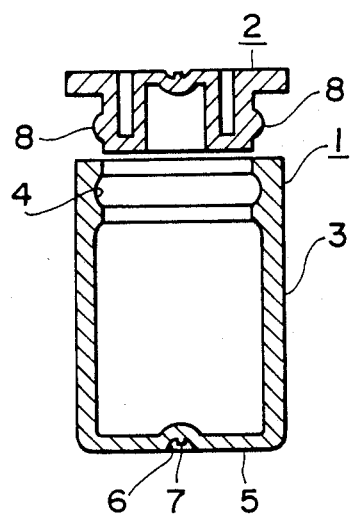
FIGS. 1 to 3 are sectional side views indicating several examples of the container to which the present invention is applied.

The polypropylene resin may be homopolypropylene resin or a copolymer resin of propylene and α-olefin of which α-olefin content is less than 10 wt. %. Preferable polypropylene resins include the propylene-α-olefin copolymer resins having a propylene content of 90 to 99 wt. % produced by using a chlorine-containing compound such as titanium trichloride or diethylaluminum monochloride as a catalyst, and propylene-ethylene random copolymer resins are particularly preferable. The MFR of the polypropylene resin is in the range of 12 to 80 g/10 minutes, preferably 16 to 60 g/10 minutes, more preferably 20 to 50 g/10 minutes, measured according to ASTM D-1238 at 230° C. under 2160 g loading. The molecular weight distribution is preferably 2 to 5 (weight average molecular weight $\overline{M}w$/number average molecular weight $\overline{M}n$ by GPC method).

Other thermoplastic resins may be blended with the polypropylene resin. A preferable thermoplstic resin among polyolefin resins is linear low density polyethylene resin.

The fatty acid amide lubricant improves injection moldability, particularly the fluidity of resin and mold releasability. It bleeds out to form a membrane of the fatty acid amide on the surface of the container body, and thereby, prevents abrasion and the blocking of the container bodies. Moreover, it makes the inner surface slippery, and thereby, improves mold releasability, prevents bucking, and makes taking out of the photographic film cartridge readily. The content of the lubricant is 0.01 to 2 wt. %. When the content is less than 0.01 wt. %, the above effects are insufficient to cause problems particularly in the case of the resin composition of which the dropping strength is remarkably raised. While, when the content is beyond 2 wt. %, screw slip occurs to decrease injection amount. The molded container body is sticky, and dust is liable to adhere to the surface, as well as feeling becomes worse. The transparency is also degraded.

Examples of commercial lubricants suitable for the present invention include:

Oleic amide lubricants; "ARMOSLIP-CP" (Lion akzo Co., Ltd.), "NEWTRON" and "NEWTRON P" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic amide lubricants; "ALFLOW P-10" (Nippon Oil and Fats Co., Ltd.), "NEWTRON S" (Nippon Fine Chemical Co., Ltd.), etc.

Stearic amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Stearylerucic amide lubricants; "SNT" (Nippon Fine Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Behenic amide; "BNT" (Nippon Fine Chemical Co., Ltd.), etc.

Two or more fatty acid amide lubricants may be combined.

The antioxidant prevents the coloring trouble at the time of temperature elevation. It is optionally incorporated, and the content is 0 to 1 wt. %. When the content is beyond 1 wt. %, it exerts a bad influence, such as fogging and increase or decrease of the sensitivity, upon the photographic film using oxidation-reduction reaction. Preferable content is 0.05 to 0.5 wt. %. There are phenol antioxidants, phosphite antioxidants, sulfur-containing antioxidants and the like, and preferable antioxidants are phenol antioxidants and phosphite antioxidants. The phenol antioxidants include n-octadecyl-3-(3',5'-di-t-butyl-4'-hydroxyphenyl) propionate, 2,6-di-t-butyl-4-methylphenol, 2,6-di-t-butyl-p-cresol (BHT), 2,2'-methylenebis(4-methyl-6-t-butylphenol), 4,4-thiobis(3-methyl-6-t-butylphenol), 4,4'-butylidenebis(3-methyl-6-t-butylphenol), stearyl-β-(3,5-di-4-butyl-4-hydroxyphenyl) propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis[methylene-3-(3',5'-di-t-butyl-4'-hydroxyphenyl)propionate]methane. The phosphite antioxidants include trinonylphenyphosphite and triphenylphosphite. The sulfur-containing antioxidants include dilaurylthiodipropionate and distearylthiopropionate. Among these, particularly preferable antioxidants are BHT, dilaurylthiodipropionate and distearyltiopropionate. Dialkyl-phosphate is also particularly preferable, though it does not belong to the above three antioxidant groups. The particularly preferable antioxidants are preferably combined.

The organic nucleating agent improves injection moldability, rigidity, transparency and physical strength. The organic nucleating agent includes carboxylic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 3 to 30, condensation products of a polyhydric alcohol and an aldehyde, and alkylamines. Examples are aluminum p-t-butylbenzoate, aluminum hydroxy-di-t-butylbenzoate, 1,3,2,4-dibenzylidenesorbitol, the di-substituted benzylidene-sorbitol represented by the following formula;

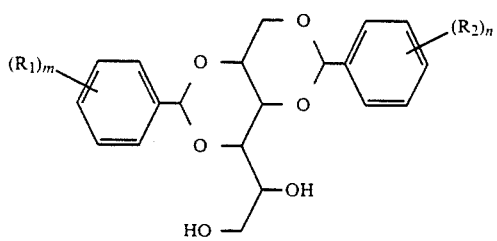

In the formula, $R_1$ and $R_2$ indicate an alkyl group or an alkoxy group having a number of carbon atoms of 1 to 8 or a halogen, and m and n are 0 to 3 and $m+n \geq 1$. such as 1,3,2,4-di(methylbenzylidene)sorbitol, 1,3,2,4-di(ethylbenzylidene)sorbitol, 1,3,2,4-di(propylbenzylidene) sorbitol, 1,3,2,4-di(methoxybenzylidene)sorbitol, 1,3,2,4-di(ethoxybenzyliene)sorbitol, 1,3,2,4-di (p-methylbenzylidene)sorbitol, 1,3,2,4-di (p-chlorobenzylidene)sorbitol, 1,3,2,4-di(alkylbenzylidene) sorbitol and 1,3,2,4-bis(methylbenzylidene)sorbitol, metal salts, such as calcium salt and magnesium salt, of stearyl lactic acid, the compounds, such as N-(2-hydroxyethyl)-stearlyamine, represented by the following formula;

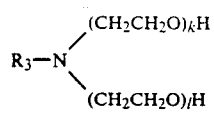

In the formula, $R_3$ indicates an alkyl group having a number of carbon atoms of 8 to 30, and k and l are 0 to 10 and $k+l \geq 1$.

metal salts, such as lithium salt, sodium salt, potassium salt, calcium salt and magnesium salt, of 1,2-dihydroxystearic acid, stearyl alcohol, lauryl alcohol, sodium benzoate, benzoic acid, and sebacic acid. Preferable nucleating agents are dibenzylidenesorbitol, the derivatives thereof and tribenzylidenesorbitol, and dibenzylidenesorbitol and its derivatives concretely enumerated are particularly preferable. The content of the organic nucleating agent is 0.01 to 1 wt. %. When the content is less than 0.01 wt. %, the effect of the nucleating agent is insufficient. While, when the nucleating agent is added beyond 1 wt. %, the effect of the excess amount of the nucleating agent is minor.

The surface of the organic nucleating agent has previously been treated with the following stabilizer in order to improve the heat stability of the organic nucleating agent and to prevent the evolution of odor. The stabilizer is selected from the group consisting of aliphatic metal salts, metal salts of alkyl lactic acids and metal salts of lactic acid. The aliphatic metal salts are metal salts of fatty acids having a number of carbon atoms of 7 to 32, preferably 11 to 26. The metal salts are alkali metal salts, such as sodium salt and potassium salt, alkaline earth metal salts, such as magnesium salt and calcium salt, zinc family element salts, such as zinc salt, and aluminum family element salts, such as aluminum salt. Examples of the aliphatic metal salt are calcium stearate, aluminum stearate, zinc stearate, sodium stearate, magnesium stearate and calcium behenate. The alkyl lactic acids are the condensates of lactic acid and a fatty acid having a number of carbon atoms of 7 to 32, preferably 11 to 26, formed by the dehydration between the hydroxyl group of lactic acid and the carboxyl group of the fatty acid. Examples of the alkyl lactic acid are stearyl lactic acid and lauryl lactic acid. During the above dehydration, the dehydration between lactic acid molecules usually occurs, and for example, stearyl lactic acid includes stearyl lactyl lactic acid and the like. The metal of the salt may be selected from mentioned above. Examples of the metal salt of alkyl lactic acid are calcium stearyl lactate and calcium lauryl lactate. The metal of the metal salt of lactic acid may be selected from mentioned above, and examples of the metal salt of lactic acid are calcium lactate and barium lactate. Among these, calcium stearate is the most preferable. The blending amount of the stabilizer is 30 to 500% by weight, preferably 100 to 300% by weight of the organic nucleating agent. However, the stabilizer may also be added for other purpose, such as improving mold-releasability. Therefore, the content of the stabilizer is usually 0.003 to 5 wt. %, preferably 0.01 to 3 wt. %.

The treatment with the stabilizer may be carried out by any method capable of coating more than 30% of the surface of the organic nucleating agent. As a preferable method, the stabilizer is mixed with the organic nucleating agent by a known method such as using ball mill or jet mill, and the mixture is heated at a temperature higher than the melting point of the stabilizer but lower than the melting point of the organic nucleating agent with stirring or other mixing method so as to coat the melted stabilizer on the organic nucleating agent. After cooling, the mixture is crushed or ground. The treatment may be carried out by melt blending, powder blending, crush blending or the like.

The bending rigidity of the resin composing the container body of the invention is preferably higher than 8,000 kg/cm$^2$, particularly higher than 10,000 kg/cm$^2$ (ASTM D-790). In addition, the notched Izod impact strength is preferably higher than 2.0 kg·cm/cm, particularly higher than 3.5 kg·cm/cm (ASTM D-256, at 20° C.).

Figure 2:
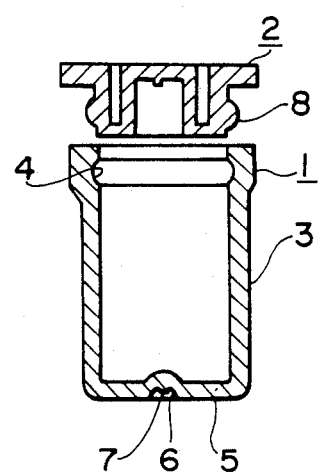
Figure 3:
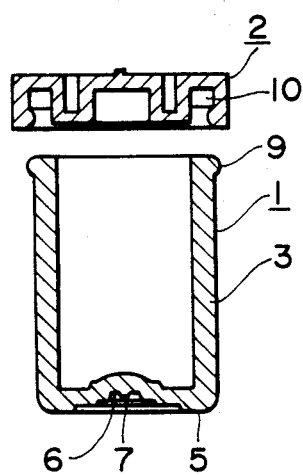
Figure 4:
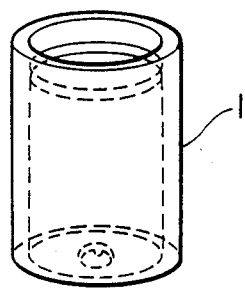
FIGS. 4 to 6 are perspective views indicating several examples of the container body combined with the case of the container to which the present invention is applied.
Figure 5:
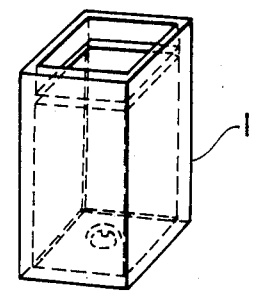
Figure 6:
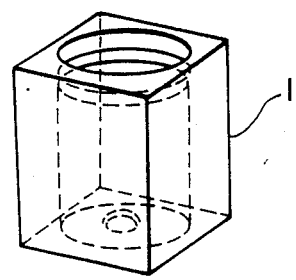

The container body of the invention may be any shape capable of placing a photographic film cartridge therein, and for example, the containers illustrated in FIGS. 1 to 3 are preferable in view of sealing and easy detachment. Particularly, the containers of FIGS. 1 and 2 have the advantage that the cap can easily be detached by one hand. The container of FIG. 1 consists of container body 1 and cap 2. Container body 1 is cylindrical, and fitting groove 4 of which the cross section is circular arc is formed around the vicinity of the opening on the inside of peripheral wall 3 thickened in the inside direction. Indent 6 so as not to project gate mark 7 is formed in the center of bottom 5. The depth of indent 6 is usually 0.5 to 5 mm, preferably 1 to 3 mm. Cap 2 is comprised of top plate portion and short tube-shaped peripheral wall portion fitted into container body 1. The indent so as not to project the gate mark is formed in the center of the upper face of cap 2, and rib 8 to fit to fitting groove 4 is formed around the vicinity of the center the peripheral wall portion. Container body 1 of FIG. 2 is the same as that of FIG. 1, except that the opening portion of peripheral wall 3 is expanded to the outside. Cap 2 of FIG. 2 is also the same as FIG. 1, except the gate portion is positioned on the reverse face, and the indent for the gate mark is not formed. Container body 1 of FIG. 3 is also cylindrical, and rib 9 of which the cross section is circular arc is formed on the outside edge of the opening. Bottom 5 of container body 1 is depressed in three steps, and gate mark 7 is present in the center of indent 6. Cap 2 is comprised of top plate portion, short tube-shaped peripheral wall portion and short tube-shaped skirt portion. The reverse channel portion 10 formed by the margin of the top plate portion, the skirt portion and the peripheral wall portion is fitted onto the opening edge of container body 1, and fixed by engaging the rib of which cross section is circular arc formed on the inside edge of the skirt portion with rib 9 of container body 1. On the other hand, the container body of the invention may be combined with the case of the container, as shown in FIGS. 4 to 6. In the embodiments, the transparency of the material composing the container body is effectively exhibited, and packaging cost may further be decreased. The combined container body of FIG. 4 is cylindrical, that of FIG. 5 is rectangular, and that of FIG. 6 is a box-shaped having a circular receiving place of photographic film cartridge.

The container body of the invention is formed by injection molding, such as injection blow molding, inter mold vacuum injection molding and stack molding using multicavity as well as common injection molding.

Preferable materials of the cap are more elastic than the container body, and preferable resins include those composed of low density polyethylene resin, L-LDPE resin or a mixture thereof, containing 0.05 to 2 wt. % of a fatty acid amide lubricant.

In the container body of the invention, the polypropylene resin imparts transparency, rigidity and injection moldability, and the fatty acid amide lubricant improves injection moldability, resin fluidity and slipping character among the molded articles to prevent the generations of blocking, static electrification, abrasion and white powder. without lowering photographic property and transparency. The antioxidant prevents yellowing, coloring and decomposition of the resin, and the organic nucleating agent improves transparency, rigidity, dropping strength and injection moldability without evolving bad smell. The container body of the invention is excellent in dropping strength, transparency and odor. The injection moldability is also excellent, because of good resin fluidity and high crystallization temperature.

EXAMPLES

Three examples of the container body of the invention, five comparative container bodies and one conventional container body were molded by using the molding machine "Nestal" (Sumitomo Heavy Industries Ltd.) at mold clamping pressure of 150 t. The type of runner is hot runner, and the molding number per once was 24. The shape of respective container bodies was the same as shown in FIG. 1, and the wall thickness was 0.7 mm on average.

The container body of Example I was composed of the resin consisting of 99.35 wt. % of propylene-ethylene random copolymer resin composed of 96.5 wt. % of propylene unit and 3.5 wt. % of ethylene unit having a MFR of 38 g/10 minutes and a molecular weight distribution ($\overline{M}w/\overline{M}n$) of 3.3 produced by vapor phase method, 0.3 wt. % of oleic amide lubricant, 0.05 wt. % of 2,6-di-t-butyl-p-cresol, 0.1 wt. % of tetrakis [methylene-3-(3',5'-di-t-butyl-4'-hydroxyphenyl)propionate]methane, 0.05 wt. % of dilaurylthiodipropionate, and 0.15 wt. % of 1,3,2,4-di(methylbenzylidene)sorbitol of which the surface had previously treated with calcium stearate. The treatment with calcium stearate was carried out as follows. Namely, calcium stearate was added to the equal weight of 1,3,2,4-di(methylbenzylidene)sorbitol, and mixed well using a ball mill. Then, the mixture was heated so that calcium stearate alone melted, and it was stirred well so as to coat calcium stearate on the sorbitol compound entirely. After cooled, the coated mixture was crushed.

The container body of Example II was composed of the resin consisting of 89.35 wt. % of propylene-ethylene random copolymer resin composed of 98 wt. % of propylene unit and 2 wt. % of ethylene unit having a MFR of 40 g/10 minutes and a $\overline{M}w/\overline{M}n$ of 3.0 produced by vapor phase method, 10.00 wt. % of L-LDPE resin being a copolymer of ethylene and 4-methylpentene-1 having a MFR of 8 g/10 minutes (ASTM D-1238, at 190° C.), a density of 0.920 g/cm$^3$ (ASTM D-1505) and a $\overline{M}w/\overline{M}n$ of 3.0, and the same contents of the same lubricant, antioxidants and organic nucleating agent as Example I.

The container body of Example III was composed of the resin consisting of 99.35 wt. % of propylene-ethylene random copolymer resin composed of 97 wt. % of propylene unit and 3 wt. % of ethylene unit having a MFR of 30 g/10 minutes and a $\overline{M}w/\overline{M}n$ of 3.5 produced by solution method, and the same contents of the same lubricant, antioxidants organic nucleating agent as Example I.

Comparative container body I was composed of the same propylene-ethylene random copolymer resin as employed in Example II alone.

Comparative container body II was composed of the same propylene-ethylene random copolymer resin as employed in Example III alone.

Comparative container body III was composed of the resin consisting of 99.5 wt. % of the same propylene-ethylene random copolymer resin and the same contents of the same lubricant and antioxidants as Example II. No organic nucleating agent was added.

Comparative container body IV was composed of the resin consisting of 99.65 wt. % of the same propylene-ethylene random copolymer resin and the same contents of the same antioxidants and organic nucleating agent as Example III. No lubricant was added.

Comparative container body V was the same as Example III, except that the 1,3,2,4-di(methylbenzylidene)sorbitol was treated with no stabilizer.

Conventional container body I was composed of the resin consisting of 99.5 wt. % of homopolypropylene resin having a MFR of 9 g/10 minutes and a $\overline{M}w/\overline{M}n$ of 3.5, 0.3 wt. % of calcium stearate as lubricant, and 0.2 wt. % of 2,6-di-t-butyl-p-cresol (BHT) as antioxidant.

Each resin composition of the above containers is summarized in Table 1, and various properties of the containers are shown in Table 2.

Molecular Weight Distribution ($\overline{M}w/\overline{M}n$)

Each resin was dissolved in o-dichlorobenzene, and the molecular weight distribution was measured by gel permeation chromatography (GPC method) using mixed polystyrene gel column. The value in the table is represented by, $$\frac{\text{Weight average molecular weight (Mw)}}{\text{Number average molecular weight (Mn)}}$$

Injection Moldability

Judged by the weight dispersion of products, the generation of short shot, the generation of bottom sink mark and stringiness, resin remains at gate, the generation of buckling and the like.

Odor

Judged by human sense of smell around the mold during molding each container body.

Crack Generation

A cartridge containing 36 exposures photographic film was placed in each container, and a cap was attached. The container was dropped to concrete floor from 5 m height at 10° C., and the number of the cracked container bodies per 100 pieces was indicated in Table 2.

TABLE 1

|  | INVENTION | | | Comparative | | | | | Conventional |
|---|---|---|---|---|---|---|---|---|---|
|  | I | II | III | I | II | III | IV | V | I |
| Polypropylene Resin | | | | | | | | | |
| MFR (g/10 min.) | 38 | 40 | 30 | 40 | 30 | 40 | 30 | 30 | 9 |
| Mw/Mn | 3.3 | 3.0 | 3.5 | 3.0 | 3.5 | 3.0 | 3.5 | 3.5 | 3.5 |
| Ethylene Content (wt. %) | 3.5 | 2.0 | 3.0 | 2.0 | 3.0 | 2.0 | 3.0 | 3.0 | 0 |
| Other Resin | | L-LDPE | | | | | | | |
| Content (wt. %) | 0 | 10 | 0 | 0 | 0 | 0 | 0 | 0 | 0 |
| Lubricant | Oleic Amide | " | " | — | — | Oleic Amide | — | Oleic Amide | Ca Stearate |
| Content (wt. %) | 0.3 | " | " | 0 | 0 | 0.3 | 0 | 0.3 | 0.3 |
| Antioxidant | 3 kinds | " | " | — | — | 3 kinds | " | " | BHT |
| Content (wt. %) | 0.2 | " | " | 0 | 0 | 0.2 | " | " | 0.2 |
| Nucleating Agent | | | | | | | | | |
| Content (wt. %) | 0.15 | " | " | 0 | 0 | 0 | 0.15 | 0.15 | 0 |
| Stabilizer | Treated | " | " | — | — | — | Treated | Not Treated | — |

TABLE 2

|  | Invention | | | Comparative | | | | | Conventional |
|---|---|---|---|---|---|---|---|---|---|
|  | I | II | III | I | II | III | IV | V | I |
| Injection Moldability | A | A | A-B | C-D | D | C-D | C-D | A-B | D-E |
| Odor | B | B | B | B | B | B | B | D | B |
| Crack Generation | A | A | A | C-D | C | C-D | A-B | A-B | E |
| (%) | 0 | 0 | 8 | 46 | 29 | 42 | 12 | 18 | 100 |
| Transparency | A | B | A | E | E | E | A | A | E |
| (cm) | 158 | 89 | 134 | 26 | 20 | 23 | 126 | 112 | 12 |

Evaluations in Table 1 were carried out as follows:
A very excellent
B excellent
C practical
D having a problem
E impractical
Testing methods were as follows:

Transparency

Each container body was gradually moved far from the transparency inspection chart of a white paper on which parallel lines each 0.5 mm in thickness were drawn at an interval of 2 mm. The transparency is expressed as the distance (cm) not seen the parallel lines.

I claim:

1. A container body for photographic film cartridge composed of a resin comprising more than 70 wt. % of polypropylene resin, 0.01 to 2 wt. % of a fatty acid amide lubricant, 0 to 1 wt. % of an antioxidant and 0.01 to 1 wt. % of an organic nucleating agent wherein more than 30% of the surface of the organic nucleating agent is coated with a stabilizer selected from the group consisting of metal salts of fatty acids metal salts of condensates of lactic acid and a fatty acid and metal salts of lactic acid.

2. The container body of claim 1 wherein said polypropylene resin is a propylene-α-olefin copolymer resin of which propylene content is 90 to 99 wt. %.

3. The container body of claim 1 wherein the melt flow rate of said polypropylene resin is 12 to 80 g/10 minutes measured according to ASTM D-1238 at 230° C. under 2160 g loading.

4. The container body of claim 1 wherein said organic nucleating agent is selected from the group consisting of carboxylic acids, dicarboxylic acids, their salts and anhydrides, salts and esters of aromatic sulfonic acids, aromatic phosphinic acids, aromatic phosphinic acids, aromatic carboxylic acids and their aluminum salts, metal salts of aromatic phosphoric acids, alkyl alcohols having a number of carbon atoms of 3 to 30, condensation products of a polyhydric alcohol and an aldehyde, and alkylamines.

5. The container body of claim 1 wherein said organic nucleating agent is selected from the group consisting of aluminum p-t-butylbenzoate, aluminum hydroxy-di-p-t-butylbenzoate, 1,3,2,4-dibenzylidenesorbitol, the di-substituted benzylidene-sorbitol represented by the following formula:

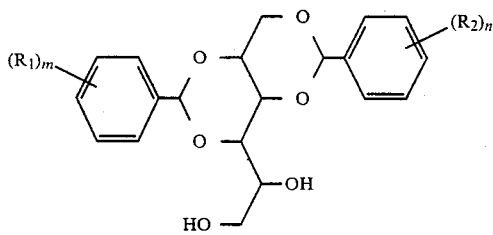

wherein $R_1$ and $R_2$ indicate an alkyl group or an alkoxy group having a number of carbon atoms of 1 to 8 or a halogen, and m and n are 0 to 3 and m+n are greater or equal to 1, metal salts, of stearyl lactic acid, the compounds, represented by the following formula:

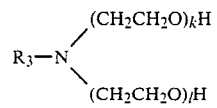

wherein $R_3$ indicates an alkyl group having a number of carbon atoms of 8 to 30, and k and l are 0 to 10 and $k+l \geq 1$, metal salts, of 1,2-dihydroxystearic acid, stearyl alcohol, lauryl alcohol, sodium benzoate, benzoic acid, and sebacic acid.

6. The container body of claim 1 wherein said organic nucleating agent is selected from the group consisting of dibenzylidenesorbitol, 1,3,2,4-di(methylbenzylidene)sorbitol, 1,3,2,4-di(ethylbenzylidene)sorbitol, 1,3,2,4-di(propylbenzylidene)sorbitol, 1,3,2,4-di(methoxybenzylidene)sorbitol, 1,3,2,4-di(ethoxybenzylidene) sorbitol, 1,3,2,4-di(p-methylbenzylidne)sorbitol, 1,3,2,4-di(p-chlorobenzylidene)sorbitol, 1,3,2,4-di(p-methoxybenzylidene)sorbitol, 1,3,2,4-di(alkylbenzylidene) sorbitol and 1,3,2,4-bis(methylbenzylidene)sorbitol and tribenzylidenesorbitol.

7. The container body of claim 1, 4 or 5 wherein said stabilizer is selected from the group consisting of calcium stearate, aluminum stearate, zinc stearate, sodium stearate, magnesium stearate, calcium behenate, calcium stearyl lactate, calcium lauryl lactate, calcium lactate and barium lactate.

8. The container body of claim 1 wherein said metal salts of fatty acids have 7 to 32 carbon atoms.

9. The container body of claim 8 wherein said metal salts of fatty acids have 11 to 26 carbon atoms.

10. The container body of claim 1 wherein said condensates of lactic acid and a fatty acid have 7 to 32 carbon atoms.

11. The container body of claim 10 wherein said condensates of lactic acid and a fatty acid have 11 to 26 carbon atoms.

* * * * *